United States Patent
Cramer et al.

(10) Patent No.: US 8,555,476 B2
(45) Date of Patent: Oct. 15, 2013

(54) METHOD AND DEVICE FOR DEPOSITING A METAL COIL

(75) Inventors: Ulrich Cramer, Attendorn (DE); Thomas Holzhauer, Kirchhundem (DE); Wolfgang Fuchs, Hilchenbach (DE); Andreas Kastner, Kirchhundem (DE); Christian Mengel, Siegen (DE); Heinz-Adolf Mueller, Wilnsdorf (DE); Carsten Heide, Netphen (DE); Karl Robert Hofmann, Netphen (DE)

(73) Assignee: SMS Siemag Aktiengesellschaft, Duesseldorf (DE)

( * ) Notice: Subject to any disclaimer, the term of this patent is extended or adjusted under 35 U.S.C. 154(b) by 0 days.

(21) Appl. No.: 13/634,012

(22) PCT Filed: Mar. 14, 2011

(86) PCT No.: PCT/EP2011/053821
§ 371 (c)(1),
(2), (4) Date: Dec. 7, 2012

(87) PCT Pub. No.: WO2011/110695
PCT Pub. Date: Sep. 15, 2011

(65) Prior Publication Data
US 2013/0075517 A1 Mar. 28, 2013

(30) Foreign Application Priority Data

Mar. 12, 2010 (DE) .......................... 10 2010 011 171
Aug. 27, 2010 (DE) .......................... 10 2010 035 690
Dec. 10, 2010 (DE) .......................... 10 2010 062 865

(51) Int. Cl.
*B23Q 17/00* (2006.01)
*B21C 47/24* (2006.01)

(52) U.S. Cl.
USPC ........................................ 29/407.01; 242/363

(58) Field of Classification Search
USPC ............ 29/407.01, 407.05, 407.09, 709, 712, 29/714, 721, 722, 779, 271; 242/363; 414/800; 248/550
See application file for complete search history.

(56) References Cited

U.S. PATENT DOCUMENTS

| | | | |
|---|---|---|---|
| 4,854,806 | A | 8/1989 | Gertsch |
| 5,044,862 | A | 9/1991 | Herigstad |
| 7,314,196 | B2 | 1/2008 | Gandelheidt |
| 8,096,158 | B2 | 1/2012 | Moser |
| 2010/0294874 | A1 | 11/2010 | Niehues |
| 2013/0071223 | A1* | 3/2013 | Cramer et al. ................ 414/800 |

FOREIGN PATENT DOCUMENTS

| | | |
|---|---|---|
| DE | 1940426 | 3/1970 |
| DE | 2806245 | 8/1979 |
| DE | 2901454 | 7/1980 |
| DE | 4334582 | 4/1995 |

(Continued)

*Primary Examiner* — John C Hong
(74) *Attorney, Agent, or Firm* — Abelman, Frayne & Schwab

(57) ABSTRACT

The invention relates to a device and a method for depositing a metal coil (200) on two support points (110-1; 110-2). In order to avoid risks, in particular instability, while depositing metal coils having high residual stress, according to the invention the risk of an unstable position of equilibrium is checked, if a change in the relative position of the two support points (110-1; 110-2) with respect to one another is foreseeable, it is carried out such that the metal coil (200) comes to rest on both support points at least approximately in a stable position of equilibrium.

49 Claims, 1 Drawing Sheet

(56) References Cited

FOREIGN PATENT DOCUMENTS

| | | |
|---|---|---|
| DE | 19714551 | 10/1998 |
| DE | 102007017 | 8/2008 |
| EP | 1647508 | 4/2006 |
| JP | 647438 | 2/1994 |
| JP | 2010005 631 | 1/2010 |
| JP | 2010253483 | 11/2010 |
| KR | 20030026479 | 4/2003 |

* cited by examiner

METHOD AND DEVICE FOR DEPOSITING A METAL COIL

The invention relates to a method of depositing a metal strip wound into a coil on first and second support points of a device and to a device itself, e.g., in form of a coil buggy.

STATE OF THE ART

At production of a conventional hot strip, there is a tendency to use in the production materials having a high strength and a large strip thickness. Those are produced from tubular steels and with wearing surfaces. When these materials are wound, a coil has a residual stress that again opens strip ends. When the limit of the residual stress is exceeded, the coil can be deposited on the coil buggy off-center, be automatically lifted of the coil buggy, or spring up (clock spring effect).

In the state of the art, different devices and methods are known which are used for stable depositing and handling of wound material with a high residual stress.

Patent Publication WO 2006/111259 discloses a stationary device for sampling metal coils in which the coil is held in a stable position on a base roller with at least one press-on roller, with a usually stationary second base roller being lifted off the coil surface to obtain a suitable free strip length for sampling. The press-on roller is spaced from the stationary roller by more than 90°. The application further discloses devices and methods for sampling metal coils.

The not yet open patent application DE 10 2009 060 2577 discloses deposition of metal coils on a reel with extraction a coil length wherein the coil is supported on at least three support points. Here likewise, two support points are separated for taking samples of coils having different diameters. The drawback of this solution consists in that always three support points are available independent on whether they are necessary for a stable deposition of a metal coil in a particular case or not. The three support points for metal coils without high residual stress occupy an unnecessary large space.

Japanese Publication JP 60 47 438 A discloses a coil buggy with two support points for deposition of a metal coil. The support points are adjustably arranged on the coil buggy but positioned stationary relative to each other. Both support points are formed as rollers one of which can be driven with a motor and a chain drive.

Proceeding from the last mentioned state of the art, the object of the invention is to so improve the method and the device for depositing a metal coil on two support points that the metal coil can be supported more reliably.

This object is achieved by a method according to claim 1. The method is characterized by the following steps: checking and determining whether a metal coil rests or would rest on both support points positioned relative to each other in an initial position, in an unstable equilibrium position; in a positive case, changing a relative position of both support points with respect to each other so that the metal coil rests or would rest on both support points at least approximately in a stable equilibrium position, and depositing the metal coil on both support points arranged in the changed relative position with respect to each other, provided that it was not already done during checking of the equilibrium position.

The term "unstable equilibrium position" means within the frame of the invention different risks or instabilities which can occur during handling and, in particular, during deposition of metal coils having a high residual stress. Because of the high residual stress, the metal coil can be deposited on a coil buggy off-center and because of the clock spring effect, spring up. Therefore, there exists a danger that the coil lifts automatically off the buggy and falls from the buggy. All these effects represent an unstable equilibrium position of the metal coil within the meaning of the present description.

The inventive merit of the invention lies in that a possibility is shown how such problematic metal coils can be recognized and, if needed, suitable measures can be taken to insure a reliable deposition of such metal coils on two support points. Specifically, the invention contemplates, with metal coils considered problematic up to the present, to so change the relative position of two support points with respect to each other that at least approximately stable equilibrium position of a metal coil on the support points is insured. The claimed measures only then are undertaken for changing the relative position of both support points when before that it is recognized that a problem of deposition of a metal coil with a high residual stress must be dealt with. Otherwise, the initial position of both support points relative to each other remains unchanged.

The checking of the above-mentioned problematic characteristics of a metal coil can take place either when the metal coil already lies on both support points or, but only purely notially, when the metal coil would be deposited. For this reason, claim 1 recites " . . . rests or would rest." A complete understanding of these facts would be clarified during a later discussion of the embodiments of the invention.

According to the first embodiment, the checking and determination step includes the following sub-steps:
  checking if the following condition is met:
  the diameter of the metal coil is smaller than a threshold diameter, and the thickness of the metal strip is greater than a threshold thickness, and the strength of the material of the metal strip is greater than a threshold strength; and
  manipulating determination that the metal coil would rest on both support points positioned relative to each other in an initial position, in an unstable equilibrium position when the condition is met.

This first possibility of checking takes place advantageously by a separate evaluation the above-mentioned criteria of the metal strip and the metal coil. For carrying out the checking, the metal coil need not actually be deposited on both support points. No expensive measurements of the metal coil itself or of the support points should be undertaken. For typically treated materials, the criteria can be provided in a table. Then, they can be quickly provided to a worker for a separate metal coil. The unstable equilibrium position, in the case when the metal coil is to be deposited on support points, is predicted or forecasted. Therefore, the mentioned determination of the unstable equilibrium position for this embodiment is simply manipulated in the sense of being implied, or assumed, or predicted.

Advantageously, the threshold diameter is set to be 2200 mm, the threshold thickness is set to be 5 mm, and the threshold strength, in particular, the tensile strength of a hot material is set to be 250 times $10^6$ N/m$^2$.

The examined condition according to the first possibility of checking of an unstable equilibrium condition, can additionally include the following criteria, namely, that the temperature of the metal coil is smaller than a predetermined threshold temperature, and the tensile strength of the hot material of the metal strip is greater than a predetermined threshold yield point. The condition is only then met when all of the criteria, including the additional ones, are met. This has an advantage that in this case, the manipulated determination of an unstable equilibrium position is additionally guaranteed, and, thereby, is given more weight.

Advantageously, the threshold temperature is set to be 600° C., and the threshold yield point is set to be 250 times $10^6$ N/m².

In addition to the first possibility, there exists a second possibility of checking and determination of the equilibrium position. This second possibility includes the following sub-steps: depositing the metal coil on both support points when those are positioned in the initial position relative to each other; dropping a plumb line from the center of the metal coil downwardly toward the support points; checking whether the plumb line is dropped between both support points; and determining that the metal coil rests on both support points in an unstable equilibrium position if the plumb line is not dropped in the middle between both support points at least within a predetermined threshold tolerance for the plumb line. The condition is only then met when all of the criteria, including additional criteria, are met. The second possibility has the advantage that it can be executed by a worker on site without a need in expensive and complex apparatuses.

Advantageously, the threshold tolerance for the plumb line lies, with reference to the middle between the support points, within +/−10% of the metal coil diameter.

In addition to the first and second possibilities, there exists a third possibility of checking and determination of the equilibrium position. The third possibility includes the following sub-steps: depositing the metal coil on both support points when those are positioned relative to each other in their initial position, measuring a load applied to a first support point when the metal coil rests on both support points, comparing the measured load with a total weight of the metal coil, and determining that the metal coil rests on both support points in an unstable equilibrium position when the measured load applied to the first support point deviates from a half of the total weight of the metal coil by more than a predetermined load threshold tolerance. This possibility requires, apart from a testing device with an integrated device for evaluation of the equilibrium, advantageously, only the measuring device on one of the two support points.

In addition to the first, second and third possibility, there exists a fourth possibility of checking and ascertaining the equilibrium position. The fourth possibility includes the following sub-steps: depositing the metal coil on both support points when those are positioned relative to each other in the initial position, measuring a load applied to the first and second support points, respectively, when the metal coil rests on both support points, comparing the measured loads with each other, and determining that the metal coil rests on both support points in an unstable equilibrium position when the measured loads per a support point deviate from each other by more than a predetermined load threshold tolerance.

The load threshold tolerance for one of the support points at third and fourth possibility is set, preferably, to be +/−25%, more preferably, +/−10%, and even more preferably, +/−5% of the weight of the metal coil.

Generally, only one of the mentioned four possibilities for checking and determination of the equilibrium position is used, as long as alternative exists. Nevertheless, naturally, several possibilities can be used for a metal coil.

Advantageously, in the initial position, both support points are arranged next to each other at the same height.

The step of changing the relative position of both support points with respect to each other can be carried out by changing the horizontal and/or vertical distance between the two support points. All of the measures for changing the relative position of both support points have always a purpose of stabilizing and securing the deposited metal coil.

During changing of the relative position, the support point with an initially smaller load is lowered or pivoted relative to the support point with an initially greater load until at least an approximately stable equilibrium position is achieved.

Alternatively, the support point with an initially larger load then the support point with an initially smaller load, can be correspondingly lifted further to achieve a stable equilibrium position.

The horizontal distance between both support points can be increased so far until at least approximately stable equilibrium position is achieved, wherein the horizontal distance, however, should always be selected smaller than the diameter of the metal coil to prevent falling of the metal coil through space between the two support points.

For a typical size of a metal coil, the horizontal distance between both support points after the change lies in a range between 650 and 1200 mm.

After or during the changing of the relative position of both support points with respect to each other, the at least approximate availability or achievement of the condition of the stable equilibrium position should be advantageously checked. The availability of a stable equilibrium condition is then confirmed when the weight of the metal coil after changing of the position, is distributed between the two support points at least within the predetermined tolerance threshold of the load, or when after changing of the position, the plumb line extends through the middle between the two support points, or at least within the predetermined tolerance threshold for the plumb line.

As a device, a coil buggy or another such, stationary support is contemplated.

The method can be carried out manually or automatically.

The above-mentioned object is further achieved with a method according to claim 19, a device according to claim 23, and a coil buggy according to claim 43. The advantages of these solutions, as long as the same features or combination of features are concerned, correspond to above-discussed advantages.

It is important to note that the invention is not limited to a certain combination or package of shown features for checking the equilibrium position and for changing of the relative position of the support points with respect to each other. Rather, it relates to all combination and packages available, provided that they are technically feasible, can be combined, and are practically usable.

Further advantageous embodiments of the invention form the subject matter of dependent claims.

The description is based on three figures, wherein.

The invention will be described in detail below with reference to the above-described figures. In all of the figures, the same technical features are designated with the same reference numerals.

Figure 1:
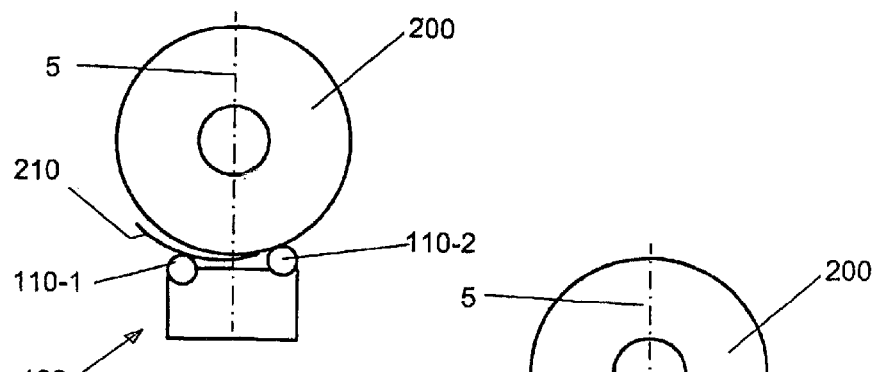
FIG. 1 shows a first embodiment of the invention with changing of a vertical distance of both support points relative to each other.

FIG. 1 shows the first embodiment of the invention wherein the device 100 has two support points 110-1 and 110-2 in form of preferably rotatably supported, rollers. A metal coil 200 is so supported on the rollers that the strip end 210 rests by the weight of the metal coil 200.

Even before the metal coil 200 is placed on the support points 110-1 and 110-2, it is determined, according to the invention, that the metal coil already has a high residual stress due to its geometrical characteristics and technical characteristics of the material and, therefore leads to problems, in particular, to an unstable position on both support points when those remain in their typically initial position in which they arranged at the same height next to each other.

According to the invention, this unstable equilibrium position should be taken into account when the diameter of the coil is smaller than the threshold diameter, e.g., of 2200 mm, and the thickness of the metal strip is greater than the threshold thickness of, e.g., 5 mm, and the strength of the metal strip material is greater than the threshold strength of, e.g., 250 times $10^6$ N/m$^2$. Even a greater probability for occurrence of the unstable equilibrium position exists when additionally the temperature of the metal coil, with which the metal coil is placed on both support points, is smaller than a predetermined threshold temperature of, e.g., 600° C., and the yield point of the hot material of the metal strip is greater than the threshold yield point, e.g., of 250 times $10^6$ N/m$^2$. The probability for occurrence of the instability and the degree of the instability grows when the mentioned threshold values are exceeded or are not attained. Correspondingly, greater changes of the relative position of both support points to each other should be undertaken to insure a stable support, despite the discerned risks.

For the embodiment shown in FIG. 1, as a counter-measure, a vertical distance between the first support point 100-1 and the second support point 100-2 is changed with respect to their initial position, in which both support points are arranged at the same height. As shown in FIG. 1, the left support point 110-1 is lowered relative to the right support point 110-2. As a result, the vertical 5 that passes through the center of the metal coil, passes through the middle between both support points 110-1 and 110-2. As a result of the undertaken measure, the changing of the vertical distance of both support points to each other, the metal coil 200 rests centrally on both support points and, thereby, a stable equilibrium position is achieved.

Figure 2:
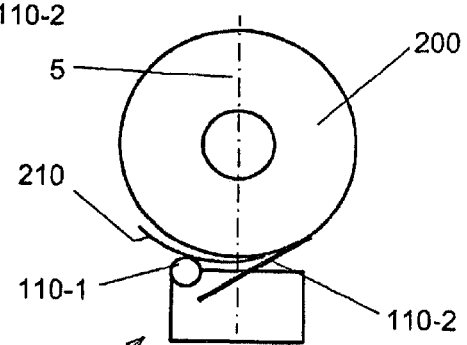
FIG. 2 shows a second embodiment of the invention with differently formed support points.

FIG. 2 shows a second embodiment of the invention that differs from the first embodiment of the invention shown in FIG. 1 in that the second support point 110-2 is not formed as a roller but is rather formed as a pivotal flap. The flap can be formed with a fixed or variable inclination.

Basically, the support points can be arranged on the device by a rocker or a wedge. The support points represent actuators which typically are adjusted electrically or hydraulically by a control device 130, see FIG. 3.

As shown in FIG. 2, the contact point at which the flap 110-2 tangentially contacts the outer circumference of the metal coil 200, lies higher than the contact point between the left support point 110-1 and the strip end 210. Thus, in the embodiment of FIG. 2, the stable equilibrium is achieved likewise by a change of the vertical distance between both support points or their contact points with the metal coil 200.

Figure 3:
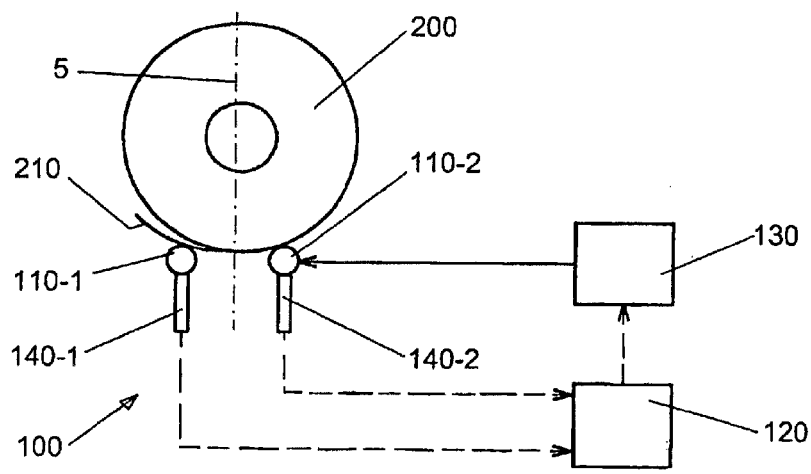
FIG. 3 shows a third embodiment of the invention with changing of a horizontal distance of both support points in connection with a force measurement for checking stability or instability of the equilibrium position.

FIG. 3 shows a third embodiment of the invention in which both support points are arranged at the same height next to each other. However, a horizontal distance of both support points 110-1 and 110-2 is variable. According to the invention, with this measure, the established instability of the metal coil 200 is so adjusted that the required stable equilibrium position is achieved.

The stable equilibrium position in FIG. 3 is determined with two load measuring devices 140-1 and 140-2 for determining a load applied to the associated support points 110-1 and 110-2 by respective portions of the weight of the metal coil 200. The load measuring devices 140-1 and 140-2 transmit the measured loads in form of electronic signals to a checking device 120 that compares the measured load portions with the total weight of the metal coil 200. When the measured load per support point deviates from each other by more than a predetermined load tolerance threshold or more than half-weight of the metal coil, the checking device detects a risk of an unstable equilibrium position. The checking device 120 transmits this information, preferably in quantized form, to a control device 130 that so adjusts at least one of both support points 110-1, 110-2 that its relative position with respect to another support point is suitably changed. In the embodiment shown in FIG. 3, the suitable change consists in that the horizontal distance a between the two support points 110-1, 110-2 is increased so long until a stable equilibrium position with a desired precision is achieved.

Alternatively to the possibility shown in FIG. 1 of determining the stable equilibrium position with a vertical, the instability can be checked by evaluating signals of load measuring devices. The stable equilibrium position is then achieved when the same portions of the weight of the metal coil 200 apply respective loads to both support points 110-1 and 110-2.

The weight of a metal coil is proportional to its diameter. With the first above-mentioned possibility of checking and determination the equilibrium position, it is possible alternatively or in addition to comparison of the metal coil diameter with a threshold diameter, also compare the coil weight with a threshold coil weight. Under the overall conditions, in addition to the above-mentioned criteria, the weight of a respective metal coil should be smaller than the threshold coil weight to meet the condition for a high residual stress. The threshold weight is about 30t. This criterion of weight comparison applies to all mentioned methods and devices.

Checking and determination of the equilibrium position can be carried out not only for a single coil but also for a coil set. For a coil set, the checking need be carried out only once when the set consist of coils substantially with the same geometrical, physical characteristics and technical characteristics of the material.

The invention claimed is:

1. A method of depositing a metal strip wound into a coil on first and second support points of a device
    characterized by the following steps:
        checking and determining whether a metal coil rests or would rest on both support points positioned relative to each other in an initial position, in an unstable equilibrium position;
        in a positive case, changing a relative position of both support points with respect to each other so that the metal coil rests or would rest on both support points at least approximately in a stable equilibrium position; and
        depositing the metal coil on both support points arranged in the changed relative position with respect to each other, provided that it was not already done during checking of the equilibrium position.

2. A method according to claim 1,
characterized in that
the step of checking and determining the equilibrium position includes the following substeps:
checking if the following condition is met:
the diameter of the metal coil is smaller than a threshold diameter, and the thickness of the metal strip is greater than a threshold thickness, and the strength of the material of the metal strip is greater than a threshold strength; and manipulating determination that the metal coil would rest on both support points positioned relative to each other in an initial position, in an unstable equilibrium position when the condition is met.

3. A method according to claim 2,
characterized in that
the threshold diameter is set to be 2200 mm;
the threshold thickness is set to be 5 mm; and
the threshold strength of a hot material is set to be $250 \text{ times } 10^6 \text{N/m}^2$.

4. A method according to claim 2,
characterized in that
the condition includes the following additional criteria:
that the temperature of the metal coil is smaller than a predetermined threshold temperature, and the tensile strength of the hot material of the metal strip is greater than a predetermined threshold yield point; and
manipulation of determination is carried out that the metal coil would rest on both support points positioned relative to each other in the initial position, in an unstable equilibrium position when the additional criteria are met.

5. A method according to claim 4,
characterized in that
the threshold temperature is set to be 600° C., and the threshold yield point is set to be $250 \text{ times } 10^6 \text{N/m}^2$.

6. A method according to claim 1,
characterized in that
the step of checking and determination of the equilibrium position includes the following sub-steps:
depositing the metal coil on both support points when those are positioned in the initial position relative to each other;
dropping a plumb line from the center of the metal coil downwardly toward the support points;
checking whether the plumb line is dropped between both support points; and
determining that the metal coil rests on both support points in an unstable equilibrium position if the plumb line is not dropped in the middle between both support points at least within a predetermined threshold tolerance for the plumb line.

7. A method according to claim 6,
characterized in that
the threshold tolerance for the plumb line lies, with reference to the middle between the support points, within +/−10% of the metal coil diameter.

8. A method according to claim 1,
characterized in that
the step of checking and determining the equilibrium position includes the following sub-steps:
depositing the metal coil on both support points when those are positioned relative to each other in their initial position;
measuring a load applied to a first support point when the metal coil rests on both support points;
comparing the measured load with a total weight of the metal coil; and
determining that the metal coil rests on both support points in an unstable equilibrium position when the measured load applied to the first support point deviates from a half of the total weight of the metal coil by more than a predetermined load threshold tolerance.

9. A method according to claim 8,
characterized in that
the load threshold tolerance for one of the support points is set to be +/−25% of the weight of the metal coil.

10. A method according to claim 8,
characterized in that the
load threshold tolerance for one of supporting points is set to be +/−10% of the weight of the metal coil.

11. A method according to claim 8,
characterized in that the
load threshold tolerance for one of supporting points is set to be +/−5% of the weight of the metal coil.

12. A method according to claim 1,
characterized in that
the step of checking and determining the equilibrium position includes following sub-steps:
depositing the metal coil on both support points when those are positioned relative to each other in the initial position;
measuring a load applied to the first and second support points, respectively, when the metal coil rests on both support points;
comparing the measured loads with each other; and
determining that the metal coil rests on both support points in an unstable equilibrium position when the measured loads per a support point deviate from each other by more than a predetermined load threshold tolerance.

13. A method according to claim 1,
characterized in that
both support points are arranged at the same height next to each other in the initial position thereof.

14. A method according to claim 1,
characterized in that
the step of changing the relative position of both support point with respect to each other includes:
changing vertical and/or horizontal distance of both support points to each other.

15. A method according to claim 14,
characterized in that
the support point with an initially smaller load is lowered or pivoted relative to the support point with an initially greater load until at least an approximately stable equilibrium position is achieved.

16. A method according to claim 14,
characterized in that
the horizontal distance between both support points is increased so far until at least approximately stable equilibrium position is achieved, wherein the horizontal distance, however, should always be selected smaller than the diameter of the metal coil.

17. A method according to claim 16,
characterized in that
the horizontal distance between both support points after the change lies in a range between 650 and 1200 mm.

18. A method according to claim 1,
characterized in that
during or after changing the relative position of both support points with respect to each other, the at least approximately obtained condition of the stable equilibrium is checked; and
the presence of the stable equilibrium is determined when the weight of the metal coil is equally distributed between both support points at least within a predetermined load threshold tolerance after changing their position, or when after position change, the plumb line lies in the middle between both support points at least within the predetermined threshold tolerance for the plumb line.

19. A method according to claim 1,
characterized in that
a coil buggy is used as an apparatus.

20. A method according to claim 1,
characterized in that
the method is carried out manually or automatically.

21. A method of depositing a metal strip wound into a coil on first and second support points of a coil buggy,
characterized by the following steps:
checking if a following condition is met:
a diameter of the metal coil is smaller than a threshold diameter, and thickness of the metal strip is greater than a threshold thickness, and strength of the material of the metal strip is greater than a threshold strength; and
manipulating determination that the metal coil would rest on both support points positioned relative to each other in an initial position, in an unstable equilibrium position when the condition is met;
changing horizontal and/or vertical distance of both support points relative to each other in comparison with an initial position thereof so that the metal coil can be deposited on both support points in a stable equilibrium position; and
depositing the metal coil on both support points having a changed relative position with respect to each other unless this has not been carried out before.

22. A method according to claim 21,
characterized in that
during or after changing the relative position of both support points with respect to each other, an equal distribution of the weight of the metal coil between both support points is checked.

23. A method according to claim 21,
characterized in that
the horizontal distance between both support points after changing lies in a range between 400 and 1200 mm.

24. A method according to claim 21,
characterized in that
the coil buggy is used as a device.

25. A device with first and second support points for deposition of a metal coil on both support points,
characterized in that
at least a first support point is arranged on the device with a possibility of changing a position thereof relative to a second support point;
a checking device is provided for checking and determining whether the metal coil rests or would rest on both support points in a stable equilibrium position; and
a control device is provided for changing the relative position of both support points to each other, when an unstable equilibrium position is determined, so that the metal coil rests on both support points at least approximately in a stable equilibrium position.

26. A device according to claim 25,
characterized in that
the checking device is formed to check whether the following condition is met: the diameter of the metal coil is smaller than a threshold diameter, and the thickness of the metal strip is greater than a threshold thickness, and the strength of the material of the metal strip is greater than a threshold strength; and when the condition is met, and to manipulate determination that the metal coil would rest on both support points positioned relative to each other in an initial position, in an unstable equilibrium position.

27. A device according to claim 26,
characterized in that
the threshold diameter is set to be 2200 mm;
the threshold thickness is set to be 5 mm; and
the threshold strength of a hot material is set to be 250 times $10^6$ N/m$^2$.

28. A device according to claim 26,
characterized in that
the checking device is formed to additionally check the following criteria of the condition: whether the temperature of the metal coil is smaller than a predetermined threshold temperature, and the tensile strength of the hot material of the metal strip is greater than a predetermined threshold yield point; and to determine by manipulating determination, that the metal coil would be deposited on both support points positioned relative to each other in the initial position, in an unstable equilibrium position when the additional criteria are met.

29. A device according to claim 28,
characterized in that
the threshold temperature is set to be 600° C.; and the threshold yield point is set to be 250 times $10^6$ N/m$^2$.

30. A device according to claim 25,
characterized in that
the checking device is formed to carry out the following steps when depositing the metal coil on both support points when those are positioned in an initial position relative to each other;
dropping a plumb line from the center of the metal coil downwardly toward the support points;
checking whether the plumb line is dropped between both support points; and
determining that the metal coil rests on both support points in an unstable equilibrium position if the plumb line is not dropped in the middle between both support points at least within a predetermined threshold tolerance for the plumb line.

31. A device according to claim 30,
characterized in that
the threshold tolerance for the plumb line lies, with reference to the middle between the support points, within +/−10% of a metal coil diameter.

32. A device according to claim 30,
characterized in that
the checking device is further formed to check during or after changing the relative position of both support points with respect to each other, an availability, at least approximately, of the stable equilibrium condition, and to determine the presence of the stable equilibrium when the weight of the metal coil is equally distributed between both support points at least within the predetermined load threshold tolerance after changing their position, or when after the position change, the plumb line lies in the middle between both support points at least within the predetermined threshold tolerance for the plumb line.

33. A device according to claim 30,
characterized in that
both support points are arranged at a same height next to each other in the initial position thereof.

34. A device according to claim 25,
characterized in that
a load measuring device is provided for measuring a load applied to a first support point when the metal coil rests on both support points;
and the checking device is formed for comparing the measured load with a total weight of the metal coil; and
determining that the metal coil rests on both support points in an unstable equilibrium position when the measured load applied to the first support point deviates from a half of the total weight of the metal coil by more than a predetermined load threshold tolerance.

35. A device according to claim 34,
characterized in that the load threshold tolerance for one of the support points is set to be +/−25% more preferably of the weight of the metal coil.

36. A device according to claim 34,
characterized in that the
load threshold tolerance for one of supporting points is set to be +/−10% of the weight of the metal coil.

37. A method according to claim 34,
characterized in that the
load threshold tolerance for one of supporting points is set to be +/−10% of the weight of the metal coil.

38. A device according to claim 25,
characterized in that
a load measuring device is provided for measuring a load applied to the first and second support points, respectively, when the metal coil rests on both support points;
the checking device is formed for comparing the measured loads with each other and for determining that the metal coil rests on both support points in an unstable equilibrium position when the measured load per a support point deviate from each other by more than a predetermined load threshold tolerance.

39. A device according to claim 25,
characterized in that
the control device is formed to change the relative position of both support points with respect to each other by changing the horizontal and/or vertical distance of both support points to each other.

40. A device according to claim 39,
characterized in that
the control device is formed to lower or pivot the support point with an initially smaller load relative to the support point with an initially greater load until at least approximately stable equilibrium position is achieved.

41. A device according to claim 39,
characterized in that
the control device is formed to increase the horizontal distance between both support points as far until at least approximately stable equilibrium position is achieved, wherein the horizontal distance, however, should always be selected smaller than the diameter of the metal coil.

42. A device according to claim 41,
characterized in that
the horizontal distance between both support points after the change lies in a range between 650 and 1200 mm.

43. A device according to claim 25,
characterized in that
the first support point is formed as a roller or a pivotal flap.

44. A device according to claim 25,
characterized in that
the second support point is formed as a roller or a pivotal flap.

45. A device according to claim 25,
characterized in that
the metal coil, when deposited on the device, is not attached.

46. A device according to claim 25,
characterized in that
a coil buggy is used as the device.

47. A coil buggy with first and second support points for disposition of a metal coil on both support points so that ends of a metal strip are held by the weight of the metal coil,
characterized in that
at least a first support point is arranged on the coil buggy with a possibility of changing a position thereof relative to a second support point;
a checking device is provided for checking whether a following condition is met;
the diameter of the metal coil is smaller than a threshold diameter, and the thickness of the metal strip is greater than a threshold thickness, and the strength of the material of the metal strip is greater than a threshold strength; and
for manipulating determination that the metal coil would rest on both support points positioned relative to each other in an initial position, in an unstable equilibrium position when the condition is met;
a control device is provided for changing the horizontal and/or vertical distance of both support points to each other when the condition is met, so that the metal strip can be deposited on both support points in a stable equilibrium condition.

48. A coil buggy according to claim 47,
characterized in that
the checking device is formed to check, during or after changing of the relative position of both support points with respect to each other, whether the weight of the metal coil is evenly distributed on both support points.

49. A coil buggy according to claim 47,
characterized in that the horizontal distance between both support points lies between 400 and 1200 mm after changing.

* * * * *